(12) United States Patent
Agematsu

(10) Patent No.: US 7,285,885 B2
(45) Date of Patent: Oct. 23, 2007

(54) SMALL MOTOR

(75) Inventor: Ikuo Agematsu, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 0 days.

(21) Appl. No.: 11/197,626

(22) Filed: Aug. 3, 2005

(65) Prior Publication Data
US 2006/0028078 A1   Feb. 9, 2006

(30) Foreign Application Priority Data
Aug. 5, 2004   (JP) .............................. 2004-228747

(51) Int. Cl.
  *H02K 5/16*   (2006.01)
(52) U.S. Cl. ..................................... 310/90
(58) Field of Classification Search .................. 310/90, 310/49 R, 40 MM
  See application file for complete search history.

(56) References Cited
U.S. PATENT DOCUMENTS
4,955,791 A * 9/1990 Wrobel ..................... 417/354

5,525,845 A * 6/1996 Beale et al. ................ 310/30
5,811,903 A * 9/1998 Ueno et al. ................ 310/90
5,959,381 A * 9/1999 Fischer et al. .............. 310/90
6,056,519 A * 5/2000 Morita et al. .............. 417/415
6,995,487 B2 * 2/2006 Simpson et al. ............ 310/90
7,023,123 B2 * 4/2006 Suzuki et al. .............. 310/261

OTHER PUBLICATIONS

Patent Abstracts of JAPAN, Publication No. 2003-333974 / published on Nov. 21, 2003 "MOTOR" Sankyo Seiki Mfg. Co., Ltd. (Appln No. 2003-060759 / Mar. 7, 2003.

* cited by examiner

*Primary Examiner*—Dang Le
*Assistant Examiner*—Nguyen Hanh
(74) *Attorney, Agent, or Firm*—Reed Smith LLP

(57) ABSTRACT

A small motor including a rotor, a stator, a bearing member which supports the rotor shaft in the radial and thrust direction and a bearing holding member which holds the bearing member. The bearing holding member is formed in a thin plate-shaped elastic member and includes a bearing holding part which holds the bearing member, arm parts which are extended outward from the bearing holding part in the radial direction in a spiral manner, and an outer peripheral part which is connected to the arm part at a position outward in the radial direction of the bearing holding part and which is fixed to the stator.

3 Claims, 4 Drawing Sheets

[Fig.3]
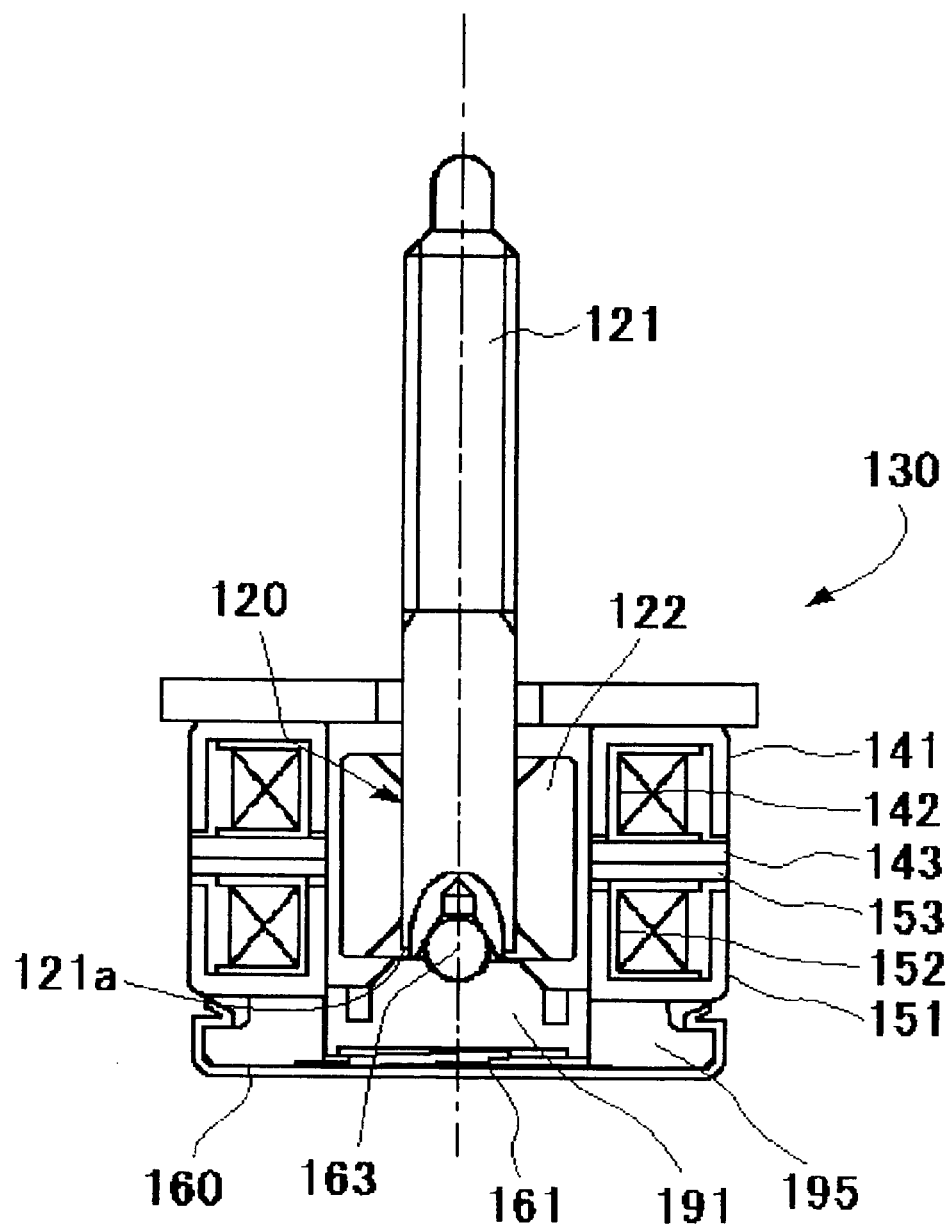
PRIOR ART

[Fig.4]
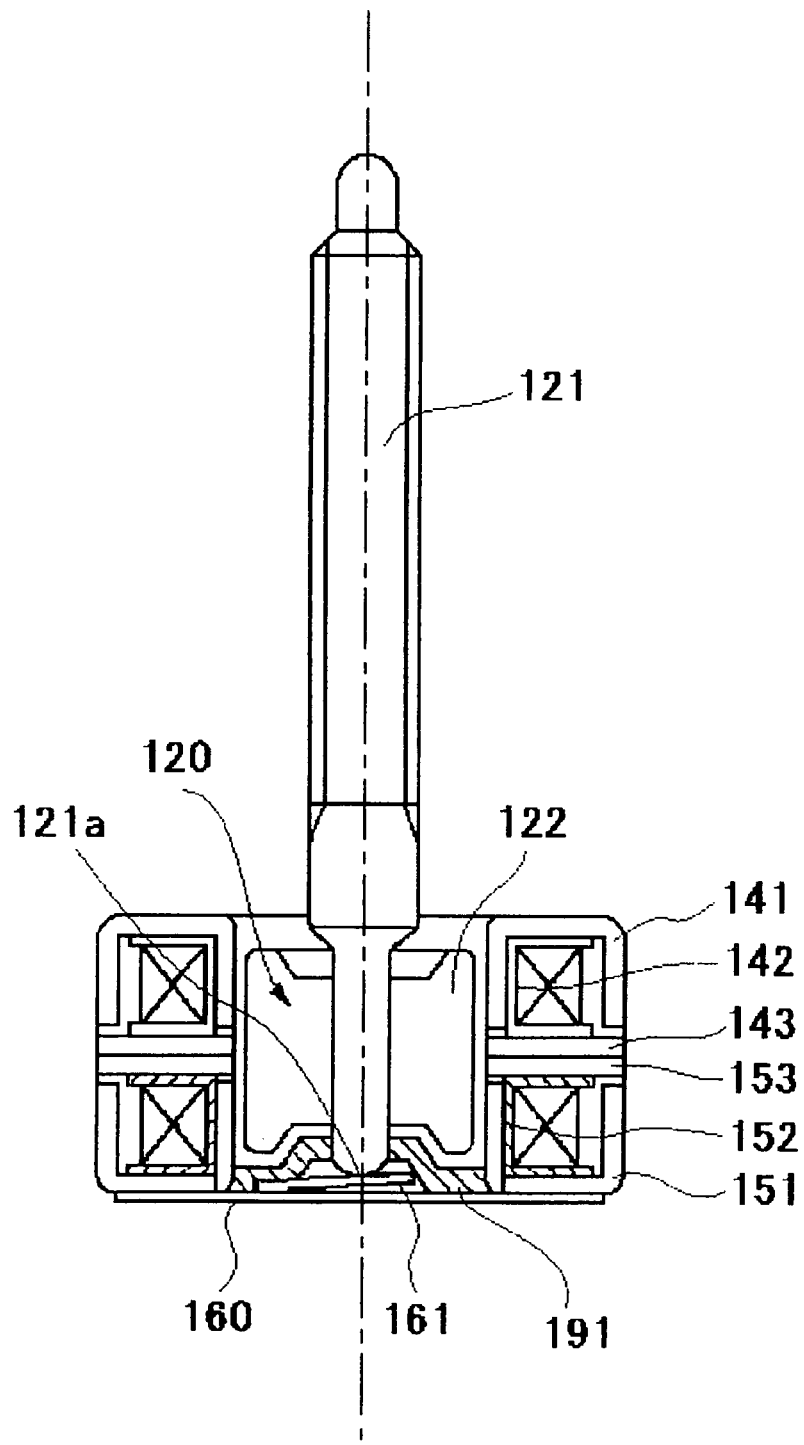
PRIOR ART

SMALL MOTOR

CROSS-REFERENCE TO RELATED APPLICATIONS

This application claims priority to Japanese Application No. 2004-228747 filed Aug. 5, 2004, which is incorporated herein by reference.

BACKGROUND OF THE INVENTION a) Field of the Invention

The present invention relates to a small motor in which a rotor, which is constructed such that a permanent magnet is fixed on the outer periphery of a rotor shaft, is rotated in the inside of a stator.

b) Description of the Related Art

A small motor is used in a drive actuator or the like for moving an object which is, for example, an optical head device used in a CD player or a DVD player. It is known that a stepping motor can be used as the small motor in which a rotor, which is constructed so that a permanent magnet is fixed to the outer periphery of a rotor shaft, is rotated in the inside of a stator having pole teeth facing the permanent magnet in a radial direction (see, for example, Japanese Patent Laid-Open No. 2003-333794).

In the stepping motor described in the related art, as shown in FIG. 3, a rotor 120 includes a rotor shaft 121 and a permanent magnet 122 which is fixed on a base end 121a side of the rotor shaft 121 that is an opposite-to-output end of the rotor shaft 121. A stator 130 includes a first outside stator core 141 and a first inside stator core 143 which are disposed to sandwich a first coil bobbin 142 around which a coil is wound from upper and lower sides. The stator 130 also includes a second inside stator core 153 and a second outside stator core 151 which are disposed to sandwich a second coil bobbin 152 around which a coil is wound from upper and lower sides.

A bearing member 191 is movably held on the base end 121a side of the rotor shaft 121 in a thrust direction by a ring-shaped bearing holding member 195, which is made of resin or metal and mounted on the outside face of the second outside stator core 151 in a motor axis line direction (thrust direction). Further, a gap space is provided between the inner peripheral face of the bearing holding member 195 and the outer peripheral face of the bearing member 191, and thus the bearing member 191 is movable in a radial direction on the inner peripheral side of the bearing holding member 195.

An end plate 160 in a thin plate shape is mounted on the outside face in the thrust direction of the bearing holding member 195. The rotor shaft 121 is urged toward an output end through the bearing member 191 and a steel ball 163 by a leaf spring 161 which is formed by the end plate 160. A steel ball holding hole in a mortar shape for holding the steel ball 163 is formed on the base end 121a of the rotor shaft 121 and a steel ball holding hole in a mortar shape for holding the steel ball 163 is formed on the bearing member 191. Thereby, the base end 121a of the rotor shaft 121 is supported by the center portion of the bearing member 191 through the steel ball in the radial direction and the thrust direction.

In the stepping motor shown in FIG. 3 as constructed above, since the bearing member 191 is moved along the inner peripheral side of the bearing holding member 195 in the thrust direction, the occurrence of a noise of the motor in the thrust direction is prevented. Further, since the base end 121a of the rotor shaft 121 is supported by the center portion of the bearing member 191 in the radial direction, the occurrence of noise in the radial direction is also prevented.

Further, in the above-mentioned related art, as shown in FIG. 4, a stepping motor is also shown in which the bearing member 191 is fixed on the inner peripheral side of the second outside stator core 151 and the thin plate-shaped end plate 160 is attached on the outside face in the thrust direction of the second outside stator core 151. In the stepping motor, the bearing member 191 is provided with a bearing hole which is formed in a through hole and the base end 121a side of the rotor shaft 121 is inserted into the bearing hole and supported in the radial direction. The base end 121a of the rotor shaft 121 is formed in a hemispheric shape and supported in the thrust direction by a plate spring 161 formed by using the end plate 160.

In the stepping motor in FIG. 4 constructed as described above, the rotor shaft 121 moves on the inner periphery of the bearing hole of the bearing member 191 in the thrust direction and thus the occurrence of noise in the thrust direction is prevented.

The stepping motor shown in FIG. 3 is structured such that the bearing member 191 supporting the base end 121a of the rotor shaft 121 in the radial direction and the thrust direction moves in the thrust direction along the inner peripheral face of the bearing holding member 195. Therefore, it is advantageous that the noise occurred in the radial direction and the thrust direction can be prevented. However, the structure of the bearing holding member 195 requires the thickness of about 2 mm in the axial direction of the motor and thus the downsizing of the stepping motor cannot be attained.

On the other hand, in the stepping motor shown in FIG. 4, the end plate 160 in a thin plate shape is directly attached on the second outside stator core 151 and thus the downsizing of the stepping motor can be attained. However, the base end 121a of the rotor shaft 121 is inserted into the bearing hole of the bearing member 191 and supported by the leaf spring 161 only in the thrust direction. Therefore, in the bearing gap space between the bearing member 191 and the rotor shaft 121, the outer peripheral face of the rotor shaft 121 strikes against the inner peripheral face of the bearing member 191 according to load conditions at the time of rotation of the rotor 120, and a so-called striking noise in the radial direction occurs. The striking noise can be reduced when the bearing gap space between the bearing member 191 and the rotor shaft 121 is decreased. However, in the stepping motor shown in FIG. 4, it is difficult to prevent the occurrence of the striking noise.

OBJECT, ADVANTAGE AND SUMMARY OF THE INVENTION

In view of the problems described above, it is a primary object and advantage of the present invention to provide a motor which is capable of attaining the downsizing of the motor while preventing the occurrence of striking noise in the radial direction which may be generated between the rotor shaft and the bearing member.

In order to achieve the above object and advantage, according to an embodiment of the present invention, there is provided a small motor including a rotor including a rotor shaft and a permanent magnet which is fixed to the outer periphery of the rotor shaft, a stator having pole teeth which face the permanent magnet in a radial direction, a bearing member which supports a base end on an opposite-to-output end of the rotor shaft in the radial direction and a thrust direction, and a bearing holding member which holds the bearing member. The bearing holding member is formed in a thin plate-shaped elastic member and includes a bearing holding part which holds the bearing member, at least an arm part which is extended outward from the bearing holding part in the radial direction in a spiral manner, and an outer peripheral part which is connected to the arm part at a position outward in the radial direction of the bearing holding part and which is fixed to the stator.

In accordance with an embodiment of the present invention, the motor is provided with a bearing member which supports a base end on an opposite-to-output end of the rotor shaft in the radial direction and a thrust direction and a bearing holding member which holds the bearing member. Therefore, the occurrence of striking noise in a bearing gap space formed between the bearing member and the rotor shaft can be prevented. Further, since the bearing holding member is formed in a thin plate-shaped elastic member, the downsizing of a motor can be attained even when the bearing member is held by the bearing holding member.

In accordance with an embodiment of the present invention, the bearing holding member is provided with a bearing holding part which holds the bearing member, at least an arm part which is extended outward from the bearing holding part in the radial direction in a spiral manner, and an outer peripheral part which is connected to the arm part at a position outward in the radial direction of the bearing holding part and which is fixed to the stator. Since the arm part is extended from the bearing holding part in a spiral manner and then connected to the outer peripheral part, the length of the arm part can be ensured and thus the bending amount of the arm part can be attained. Therefore, the bearing member which is held by the bearing holding part can be movably held in the thrust direction even when the bearing holding member is formed of a thin plate-shaped elastic member. Accordingly, the occurrence of noise generated in the thrust direction can be prevented.

In accordance with an embodiment of the present invention, the bearing holding member is preferably provided with three or more arm parts. According to the construction described above, since the bearing holding part is supported by three or more arm parts, the support strength for the bearing member can be ensured in the thrust direction and the radial direction even when the arm part is extended from the bearing holding part in a spiral manner such that the length of the arm part is ensured to obtain the bending amount of the arm part.

In accordance with an embodiment of the present invention, the motor is preferably provided with a restriction member for restricting the moving amount in the thrust direction of the rotor in order to prevent the damage of the bearing holding member. In this case, the damage of the bearing holding member formed in a thin plate shape which is caused by excessive bending is prevented by the restriction member. The restriction member may be a ring-shaped member which is preferably made of resin and attached on the outside face in the thrust direction of a stator core constructing the stator, and the restriction member may be provided with a moving restriction part which is protruded on an output end side of the rotor shaft in the thrust direction and positioned on the inner peripheral side of the stator core.

Further, in accordance with an embodiment of the present invention, a recessed part may be formed at a center portion of the end face on the opposite-to-output end side of the permanent magnet, and the bearing member is capable of coming into the recessed part in the thrust direction. In this case, the dimension of the recessed part in the radial direction may be set to be larger than that of the bearing member in the radial direction. According to the construction described above, the excessive bending of the bearing holding member formed in a thin plate shape can be prevented and the bearing member can be positioned nearer to the permanent magnet in the axial direction, and thus further downsizing of the motor in the axial direction can be attained.

As described above, in accordance with an embodiment of the present invention, the motor is provided with a bearing member which supports the base end on the opposite-to-output end of the rotor shaft in the radial direction and a thrust direction and a bearing holding member which holds the bearing member. Therefore, the occurrence of striking noise in the bearing gap space formed between the bearing member and the rotor shaft can be prevented. Further, since the bearing holding member is formed in a thin plate-shaped elastic member, the downsizing of the motor can be attained even when the bearing member is held by the bearing holding member. In particular, in accordance with an embodiment of the present invention, since the arm part is extended from the bearing holding part in a spiral manner and then connected to the outer peripheral part, the length of the arm part can be ensured and thus the bending amount of the arm part can be attained. Therefore, the bearing member that is held by the bearing holding part can be movably held in the thrust direction even when the bearing holding member is formed of a thin plate-shaped elastic member. Accordingly, the occurrence of noise generated in the thrust direction can be prevented.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 3 is a cross-sectional side view showing a conventional small motor; and

FIG. 4 is a cross-sectional side view showing another conventional small motor

DETAILED DESCRIPTION OF THE PREFERRED EMBODIMENTS

An embodiment of the present invention will be described in detail below with reference to the accompanying drawings.

Figure 1:
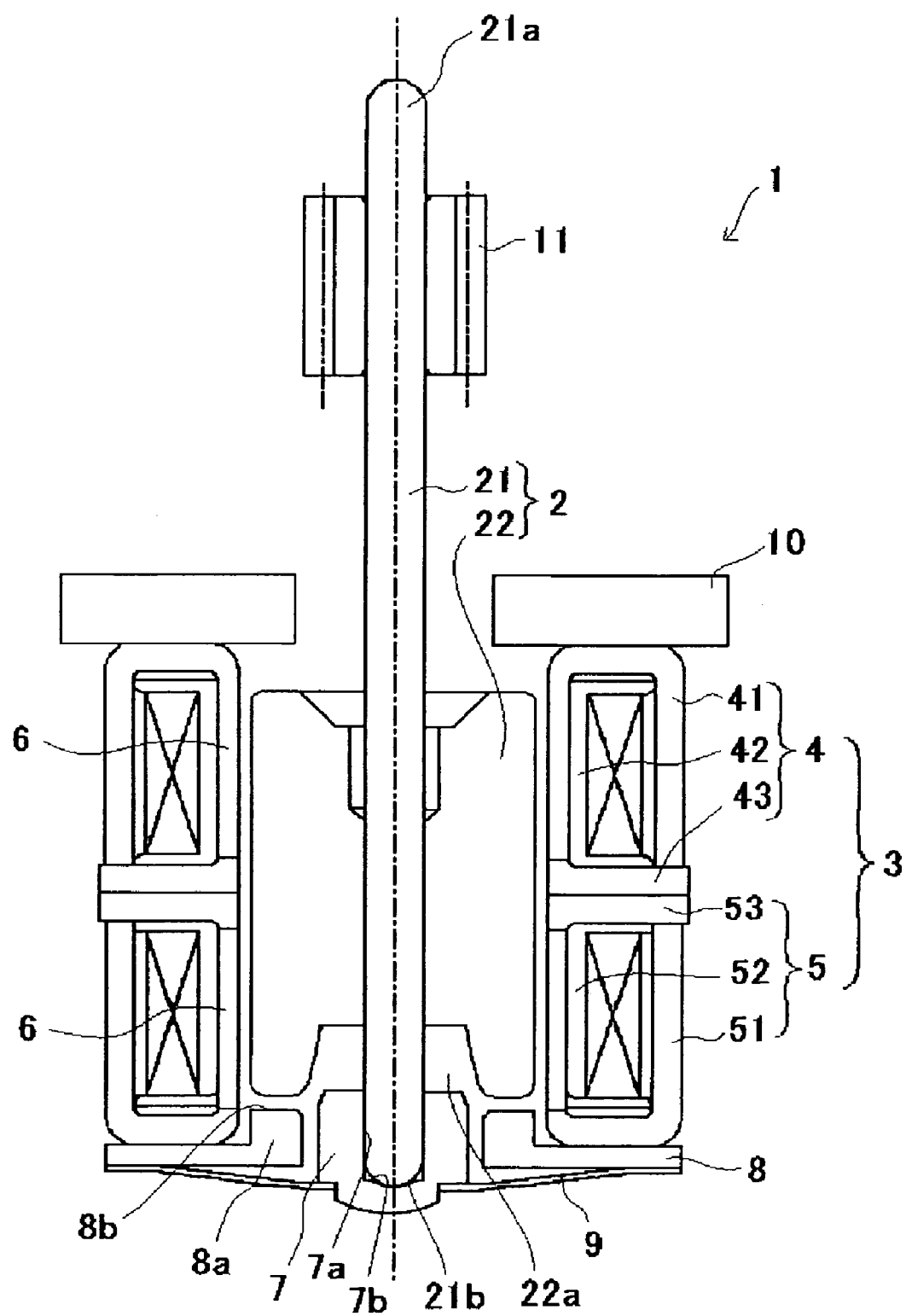
FIG. 1 is a cross-sectional side view showing a small motor in accordance with an embodiment of the present invention.
Figure 2:
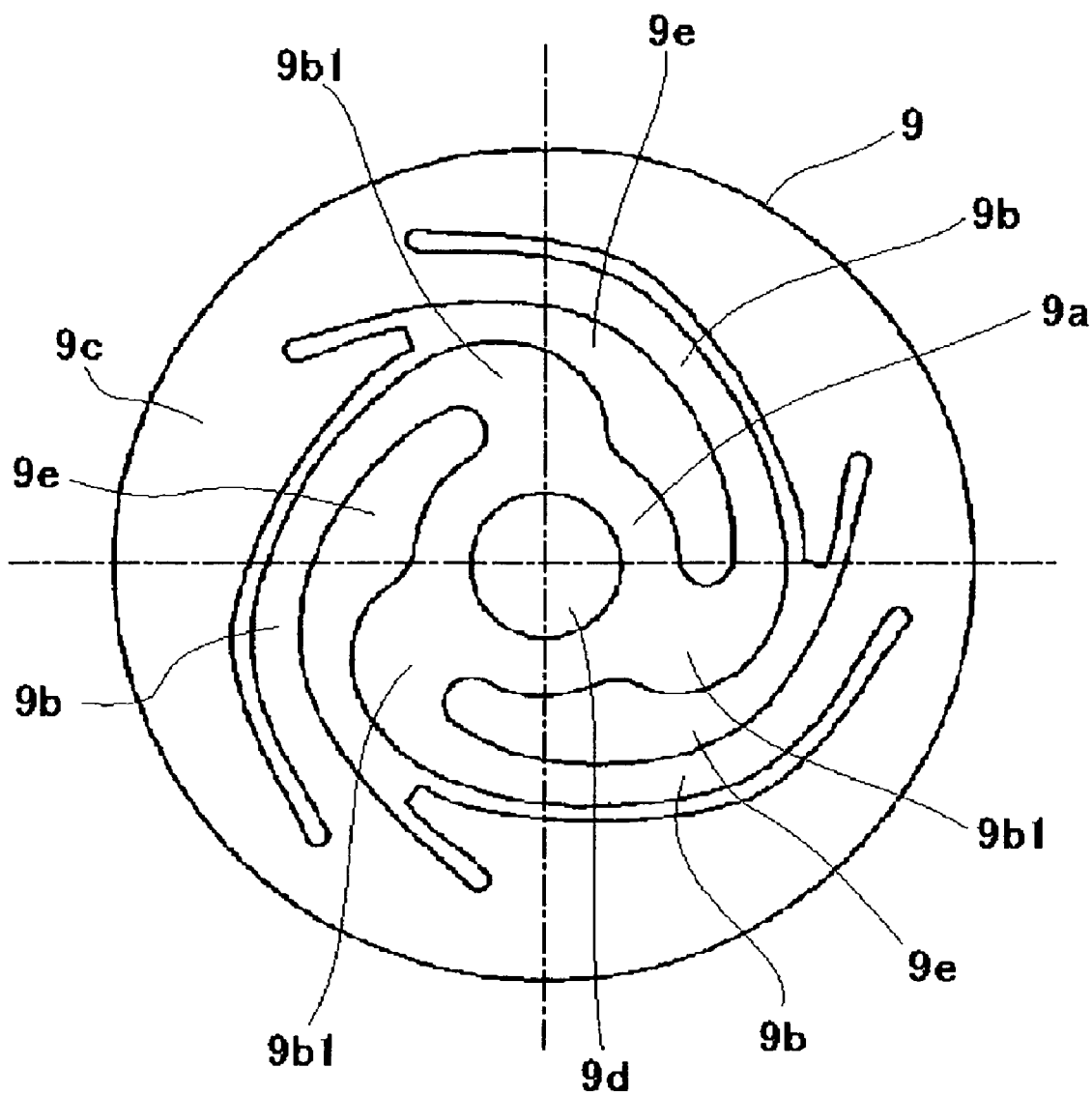
FIG. 2 is a plan view showing the bearing holding member of the small motor shown in FIG. 1.

FIG. 1 is a cross-sectional side view showing a small motor in accordance with an embodiment of the present invention. FIG. 2 is a plan view showing the bearing holding member of the small motor shown in FIG. 1.

A small motor 1 in accordance with an embodiment of the present invention is a so-called PM type stepping motor, which includes a rotor 2 having a rotor shaft 21 and a cylindrical permanent magnet 22, a stator 3 having pole teeth 6 facing the permanent magnet 22 in the radial direction, and a base plate 10 which is fixed to the stator 3 on the output end side of the rotor shaft 21. A restriction member 8 for restricting the moving amount of the rotor 2 in the thrust direction and a bearing holding member 9 are provided on the opposite-to-output end side of the stator 3 (the base end 21*b* side of the rotor shaft 21).

Both the output end 21*a* and the base end 21*b* which is the opposite-to-output end of the rotor shaft 21 constructing the rotor 2 are formed in a hemispheric shape. The output end 21*a* of the rotor shaft 21 is capable of being supported in the radial direction and the thrust direction by a bearing member not shown in the drawing, which is provided in a host device in which the small motor 1 is used. A gear 11 is fixed on the output end 21*a* side of the rotor shaft 21 by a fixing means such as press fitting. In addition, a permanent magnet 22 is fixed on the outer periphery on the base end 21*b* side of the rotor shaft 21.

A recessed part 22*a* is formed at the center portion of the end face on the opposite-to-output end side of the permanent magnet 22. The dimension of the recessed part 22*a* in the radial direction is set to be larger than that of the bearing member 7 in the radial direction and thus the bearing member 7 is capable of coming in and out from the recessed part 22*a* in the thrust direction.

The stator 3 is constructed of a first stator assembly 4 and a second stator assembly 5. The stator assemblies 4 and 5 are disposed so as to be overlapped each other in the axial direction. The first stator assembly 4 is constructed of a first outside stator core 41, a first coil bobbin 42 around which a coil is wound, and a first inside stator core 43 with which the first coil bobbin 42 is sandwiched together with the first outside stator core 41. The first stator assembly 4 is located on the output end side of the rotor shaft 21. On the inner peripheral side of the first coil bobbin 42, a plurality of pole teeth 6 are disposed which are respectively formed in the first outside stator core 41 and the first inside stator core 43 such that the respective plurality of pole teeth 6 are adjacent to each other in the circumferential direction.

The second stator assembly 5 is constructed of a second outside stator core 51, a second coil bobbin 52 around which a coil is wound, and a second inside stator core 53 with which the second coil bobbin 52 is sandwiched together with the second outside stator core 51. The second stator assembly 5 is located on the opposite-to-output end side of the rotor shaft 21. On the inner peripheral side of the second coil bobbin 52, a plurality of pole teeth 6 are disposed which are respectively formed in the second outside stator core 51 and the second inside stator core 53 such that the respective plurality of pole teeth 6 are adjacent to each other in the circumferential direction.

The restriction member 8 for restricting the moving amount of the rotor 2 in the thrust direction is a ring-shaped member made of resin and is mounted on the outside face in the thrust direction of the second outside stator core 51 constructing the stator 3. A moving restriction part 8*a* which protrudes toward the output end side of the rotor shaft 21 in the thrust direction is formed on the inner peripheral side of the restriction member 8. The moving restriction part 8*a* is provided with an abutting part 8*b* that is capable of abutting with the end face on the opposite-to-output end side of the permanent magnet 22. The moving amount of the rotor 2 in the thrust direction is restricted because the end face on the opposite-to-output end side of the permanent magnet 22 abut with the abutting part 8*b* and thus damage of the bearing holding member 9 is prevented.

The bearing holding member 9 is a disk-shaped member which is formed of a thin plate-shaped elastic member, for example, a spring steel plate made of stainless steel. The bearing holding member 9 is provided with a bearing holding part 9*a* for holding the bearing member 7, arm parts 9*b* which are spirally extended outward from the bearing holding part 9*a* in the radial direction, and an outer peripheral part 9*c* which is connected with the arm parts 9*b* at the outside positions of the bearing holding part 9*a* in the radial direction (see FIG. 2). The thickness of the bearing holding member 9 is, for example, 0.8 mm.

The bearing holding part 9*a* is located at the center portion of the bearing holding member 9 and is formed in a roughly ring shape. A holding hole 9*d* for holding the bearing member 7 is formed at the center portion of the bearing holding part 9*a*.

In the embodiment of the present invention, three arm parts 9*b* are extended from the bearing holding part 9*a* at an equal angular pitch of about 120°. The arm part 9*b* is spirally extended outward in the radial direction from a peripheral thick part 9*b*1 having a relatively wide thickness in the circumferential direction which is slightly extended radially outward from the bearing holding part 9*a* in the radial direction. More specifically, the arm part 9*b* is spirally extended at an angle of about 150° from the peripheral thick part 9*b*1 in the circumferential direction. The arm parts 9*b* are formed such that three cut-out parts 9*e* are punched by press working which are spirally formed so as to interpose the arm part 9*b* from the inner side and the outer side in the radial direction. The one end side in the circumferential direction of the cut-out part 9*e* is formed in a bifurcated manner to ensure the strength in the connecting portion between the arm part 9*b* and the outer peripheral part 9*c* by ensuring the thickness in the circumferential direction of the connecting portion.

The outer peripheral part 9*c* is located on the further outer peripheral side of the arm part 9*b* and formed roughly in a ring shape. Three arm parts 9*b* are connected to the inner periphery of the outer peripheral part 9*c* and the outer peripheral side of the outer peripheral part 9*c* is attached to the outside face in the thrust direction of the second outside stator core 51 constructing the stator 3 through the restriction member 8.

In the embodiment of the present invention, as shown in FIG. 1, the small motor 1 is mounted on a host device in the state that the arm parts 9*b* of the bearing holding member 9 are forcibly bent on the opposite-to-output end side. Therefore, pressurization is applied to the bearing member 7 on the output end side by the urging force of the bearing holding member 9. Further, in the embodiment of the present invention, as described above, the damage of the bearing holding member 9 caused by excessive bending, for example, plastic deformation is prevented by the restriction member 8.

The bearing member 7 is a member which is made of resin and shaped in a bottomed cylinder. The bearing member 7 is held by the holding hole 9*d* of the bearing holding member 9. The base end 21*b* of the rotor shaft 21 is supported by the bearing member 7. More specifically, the inner peripheral face 7*a* of the bearing member 7 supports the base end 21*b* of the rotor shaft 21 in the radial direction. Further, the inner side bottom face 7*b* of the bearing member 7 is formed in a mortar shape having a tapered face of about 150°. Therefore, the base end 21*b* of the rotor shaft 21 which is formed in the hemispheric shape is supported by the inner side bottom face 7*b* in the radial direction and the thrust direction. A bearing gap space is formed between the inner peripheral face 7*a* of the bearing member 7 and the outer peripheral face of the rotor shaft 21.

The bearing member 7 can be moved in the thrust direction because the arm parts 9*b* are bent in the thrust direction in the state that the bearing member 7 is held by the holding hole 9d of the bearing holding member 9. When the bearing member 7 moves on the output end side, a part of the bearing member 7 is capable of entering the recessed part 22a of the permanent magnet 22.

As described above, in the small motor 1 in this embodiment of the present invention, the inner side bottom face 7b of the bearing member 7 held by the bearing holding member 9 is formed in a mortar shape and the base end 21b of the rotor shaft 21 formed in a hemispheric shape is supported in the radial direction and the thrust direction by the inner side bottom face 7b of the bearing member 7. Therefore, the occurrence of striking noise in the bearing gap space between the inner peripheral face 7a of the bearing member 7 and the rotor shaft 21 can be prevented.

The bearing holding member 9 is formed of a spring steel plate having a thin plate shape. The bearing holding member 9 is attached to the outside face in the thrust direction of the second outside stator core 51 constructing the stator 3 through the restriction member 8. Therefore, the small motor 1 can be miniaturized in the axial direction even when the bearing member 7 is held by the bearing holding member 9. Further, when the bearing member 7 is moved on the output end side, a part of the bearing member 7 comes into the recessed part 22a of the permanent magnet 22 and thus further downsizing can be attained in the axial direction.

Particularly, in this embodiment of the present invention, the bearing holding member 9 is provided with the bearing holding part 9a which holds the bearing member 7, the arm parts 9b and the outer peripheral part 9c. The arm part 9b is extended from the bearing holding part 9a in a spiral manner and connected to the outer peripheral part 9c. Therefore, the length of the arm part 9b can be ensured and thus the bending amount of the arm part 9b can be also ensured. Accordingly, even when the bearing holding member 9 is formed of the spring steel plate having a thin plate shape, the bearing member 7 held by the bearing holding part 9a can be movably held in the thrust direction, and thus the occurrence of the noise generated in the thrust direction can be prevented.

In this embodiment of the present invention, the bearing holding member 9 is provided with three arm parts 9b. The arm part 9b is extended from the bearing holding part 9a in a spiral manner such that the length of the arm part 9b is ensured to obtain the bending amount of the arm part 9b. However, the bearing holding part 9a is supported by three arm parts 9b and thus the support strength for the bearing member 7 can be ensured in the thrust direction and the radial direction. Particularly, in this embodiment of the present invention, three arm parts 9b are extended from the bearing holding part 9a at an equal angular pitch of about 120° and thus the bearing member 7 can be supported securely in the radial direction.

In this embodiment of the present invention, the small motor 1 is provided with the restriction member 8 for restricting the moving amount in the thrust direction of the rotor 2 in order to prevent the damage of the bearing holding member 9. Therefore, the damage of the bearing holding member 9 formed in a thin plate shape which is caused by excessive bending is prevented by the restriction member 8.

The present invention has been described in detail by using the embodiment, but the present invention is not limited to the embodiment described above and many modifications can be made without departing from the present invention. For example, in the embodiment described above, the restriction member 8 for restricting the moving amount in the thrust direction of the rotor 2 is formed on the opposite-to-output end side of the motor. However, the restriction member 8 may be provided on the output end side to restrict the moving amount on the opposite-to-output end side of the rotor 2. Further, when the bearing holding member 9 has prescribed enough spring strength, the restriction member 8 is not always required. When the restriction member 8 is not provided, the bearing holding member 9 is directly attached on the second outside stator core 51 and thus the downsizing of the small motor 1 can be further attained in the axial direction.

Further, the number of the arm parts 9b is not limited to three. However, the bearing holding member 9 is preferably provided with three or more arm parts 9b in order to support the bearing member 7 securely in the radial direction.

In addition, the small motor 1 is not limited to a motor in which the gear 11 is fixed to the rotor shaft 21. The present invention may be applied to a motor in which a lead screw is formed on the output end side of the rotor shaft 21. Further, in the embodiment described above, the present invention is applied to a cantilevered type of small motor 1 in which only the bearing member 7 is provided on the opposite-to-output end side. However, the present invention can be applied to a two-end supporting type of motor in which the bearing member is also provided on the output end side.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A small motor comprising:

a rotor including a rotor shaft and a permanent magnet which is fixed to an outer periphery of the rotor shaft, and the base end is formed in a hemispheric shape;

a stator having pole teeth which face the permanent magnet in a radial direction;

a bearing member which supports a base end on an opposite-to-output end of the rotor shaft in the radial direction and a thrust direction; and a bearing holding member which holds the bearing member, the bearing holding member being formed in a thin plate-shaped elastic member and the bearing holding member including a bearing holding part which holds the bearing member, at least an arm part which is extended outward from the bearing holding part in the radial direction in a spiral manner, and an outer peripheral part which is connected to the arm part at a position outward in the radial direction of the bearing holding part and which is fixed to the stator, wherein the arm parts of the bearing holding member are forcibly bent on the opposite-to-output side so that the bearing member is capable moving in the axial direction and pressurization is applied to the bearing member on the output end side by an urging force of the arm parts of the bearing holding member, wherein the bearing member is made of resin and shaped in a bottomed cylinder, and an inner side bottom face of the bottomed cylinder is formed in a mortar shape having a tapered face, wherein the base end of the rotor shaft is inserted into the bottomed cylinder of the bearing member such that the hemispheric shape of the rotor shaft is supported by the mortar-shape having the tapered face of the bearing member, wherein a restriction member for restricting a moving amount in the thrust direction of the rotor wherein the restriction member is a ring-shaped member which is made of resin and attached on an outside face in the thrust direction of a stator core constructing the stator, and the restriction member is provided with a moving restriction part which protrudes on an output end side of the rotor shaft in the thrust direction and is positioned on an inner peripheral side of the stator core, wherein the restriction member is disposed between the outside face of the thrust direction of the stator core and the bearing holding member and the moving restriction part of the restriction member is provided with an abutting part which is capable of abutting with the end face on the opposite-to-output end side of the permanent magnet when pressurization is applied to the bearing member on the output side, a space is secured between the arm parts and the restriction member and a second space between the end face on the opposite-to-output end side of the permanent magnet and the abutting part of the moving restriction part is secured.

2. The small motor according to claim 1, wherein the bearing holding member is provided with three or more arm parts.

3. The small motor according to claim 1, wherein a recessed part is formed at a center portion of an end face on the opposite-to-output end side of the permanent magnet, and the bearing member is capable of entering into the recessed part in the thrust direction.

* * * * *